(12) United States Patent
Jawahar et al.

(10) Patent No.: US 12,608,778 B2
(45) Date of Patent: Apr. 21, 2026

(54) SYSTEM AND METHOD FOR GENERATING DERAINED IMAGE USING SELF-SUPERVISED LEARNING MODEL

(71) Applicants: International Institute of Information Technology, Hyderabad, Hyderabad (IN); Indian Institute of Technology, Delhi, New Delhi (IN); Indian Institute of Technology, Hyderabad, Sangareddy (IN)

(72) Inventors: C.V. Jawahar, Hyderabad (IN); Rohit Saluja, Hyderabad (IN); Chetan Arora, New Delhi (IN); Vineeth N Balasubramanian, Sangareddy (IN); Shyam Nandan Rai, Hyderabad (IN)

(73) Assignees: INTERNATIONAL INSTITUTE OF INFORMATION TECHNOLOGY, HYDERABAD, Hyderabad (IN); INDIAN INSTITUTE OF TECHNOLOGY, DELHI, New Delhi (IN); INDIAN INSTITUTE OF TECHNOLOGY, HYDERABAD, Sangareddy (IN)

( * ) Notice: Subject to any disclaimer, the term of this patent is extended or adjusted under 35 U.S.C. 154(b) by 360 days.

(21) Appl. No.: 18/138,060

(22) Filed: Apr. 22, 2023

(65) Prior Publication Data

US 2023/0385994 A1 Nov. 30, 2023

(30) Foreign Application Priority Data

Apr. 22, 2022 (IN) .............................. 202241023945

(51) Int. Cl.
| | |
|---|---|
| *G06T 5/77* | (2024.01) |
| *G06T 5/73* | (2024.01) |
| *G06T 7/136* | (2017.01) |

(52) U.S. Cl.
CPC .................. *G06T 5/77* (2024.01); *G06T 5/73* (2024.01); *G06T 7/136* (2017.01);
(Continued)

(58) Field of Classification Search
CPC .... G06T 5/77; G06T 5/73; G06T 5/60; G06T 7/136; G06T 2207/20076;
(Continued)

(56) References Cited

U.S. PATENT DOCUMENTS

| | | | |
|---|---|---|---|
| 2012/0236184 A1* | 9/2012 | Jia ............................. | H04N 7/18 |
| | | | 348/241 |
| 2013/0242188 A1* | 9/2013 | Tripathi .................... | G06T 5/77 |
| | | | 348/453 |

(Continued)

FOREIGN PATENT DOCUMENTS

| | | | | |
|---|---|---|---|---|
| CN | 110246102 A | * | 9/2019 | ............... G06T 5/70 |

OTHER PUBLICATIONS

S. Zheng, C. Lu, Y. Wu and G. Gupta, "SAPNet: Segmentation-Aware Progressive Network for Perceptual Contrastive Deraining," 2022 IEEE/CVF Winter Conference on Applications of Computer Vision Workshops (WACVW), Waikoloa, HI, USA, 2022, pp. 52-62, doi: 10.1109/WACVW54805.2022.00011. (Year: 2022).*

(Continued)

*Primary Examiner* — Chan S Park
*Assistant Examiner* — Paulo Andres Garcia

(57) ABSTRACT

A method for generating a derained image using a self-supervised learning model is provided. The method includes (i) processing an input image received from a user device; (ii) classifying pixels of the input image as rainy or non-rainy pixels by assigning a first value to the rainy pixels and a second value to the non-rainy pixels; (iii) generating a masked area in the input image by masking out the rainy pixels from the input image based on the rainy pixels; (iv)

(Continued)

generating an inpainted image by filling the masked area using an image inpainting method; and (v) generating an optimized image by deraining the inpainted image and remove image artifacts and blurriness caused by the image inpainting method. The optimized image enables an improved semantic segmentation of the input image and object detection.

12 Claims, 12 Drawing Sheets

(52) U.S. Cl.
CPC ............... *G06T 2207/20076* (2013.01); *G06T 2207/20081* (2013.01); *G06T 2207/20084* (2013.01); *G06T 2207/30192* (2013.01)

(58) Field of Classification Search
CPC . G06T 2207/20081; G06T 2207/20084; G06T 2207/30192
See application file for complete search history.

(56) References Cited

U.S. PATENT DOCUMENTS

| | | | |
|---|---|---|---|
| 2019/0050969 A1* | 2/2019 | Ulaganathan | ........... G06T 7/001 |
| 2021/0248718 A1* | 8/2021 | Yu | ............................. G06T 5/77 |

OTHER PUBLICATIONS

Garg, K., Nayar, S.K. Vision and Rain. Int J Comput Vis 75, 3-27 (2007). https://doi.org/10.1007/s11263-006-0028-6 (Year: 2007).*
H. Wang, Q. Xie, Q. Zhao and D. Meng, "A Model-Driven Deep Neural Network for Single Image Rain Removal," in 2020 IEEE/CVF Conference on Computer Vision and Pattern Recognition (CVPR), Seattle, WA, USA, 2020, pp. 3100-3109, doi: 10.1109/CVPR42600.2020.00317. (Year: 2020).*
J.-H. Zhuang, Y.-S. Luo, X.-L. Zhao and T.-X. Jiang, "Reconciling Hand-Crafted and Self-Supervised Deep Priors for Video Directional Rain Streaks Removal," in IEEE Signal Processing Letters, vol. 28, pp. 2147-2151, 2021, doi: 10.1109/LSP.2021.3120598. (Year: 2021).*
Yang, W., Wang, S., Xu, D., Wang, X., & Liu, J. (2020). Towards Scale-Free Rain Streak Removal via Self-Supervised Fractal Band Learning. Proceedings of the AAAI Conference on Artificial Intelligence, 34(07), 12629-12636. https://doi.org/10.1609/aaai.v34i07.6954 (Year: 2020).*
Wenhan Yang, Robby T. Tan, Shiqi Wang, Jiaying Liu; Proceedings of the IEEE/CVF Conference on Computer Vision and Pattern Recognition (CVPR), 2020, pp. 1720-1729 (Year: 2020).*
Y. Wei, Z. Zhang, H. Zheng, R. Hong, Yi Yang, and M. Wang. 2022. SGINet: Toward Sufficient Interaction Between Single Image Deraining and Semantic Segmentation, Association for Computing Machinery,https://doi.org/10.1145/3503161.3548241 (Year: 2022).*
Q. Guo, J. Sun, F. Juefei-Xu, Lei Ma, X. Xie, Wei Feng, Y. Liu, EfficientDeRain: Learning Pixel-wise Dilation Filtering for High-Efficiency Single-Image Deraining, 2020, https://arxiv.org/abs/2009.09238 (Year: 2020).*

* cited by examiner

USER DEVICE
104

102

NETWORK
106

IMAGE DERAINING SERVER
108

MACHINE LEARNING
MODEL
110

100

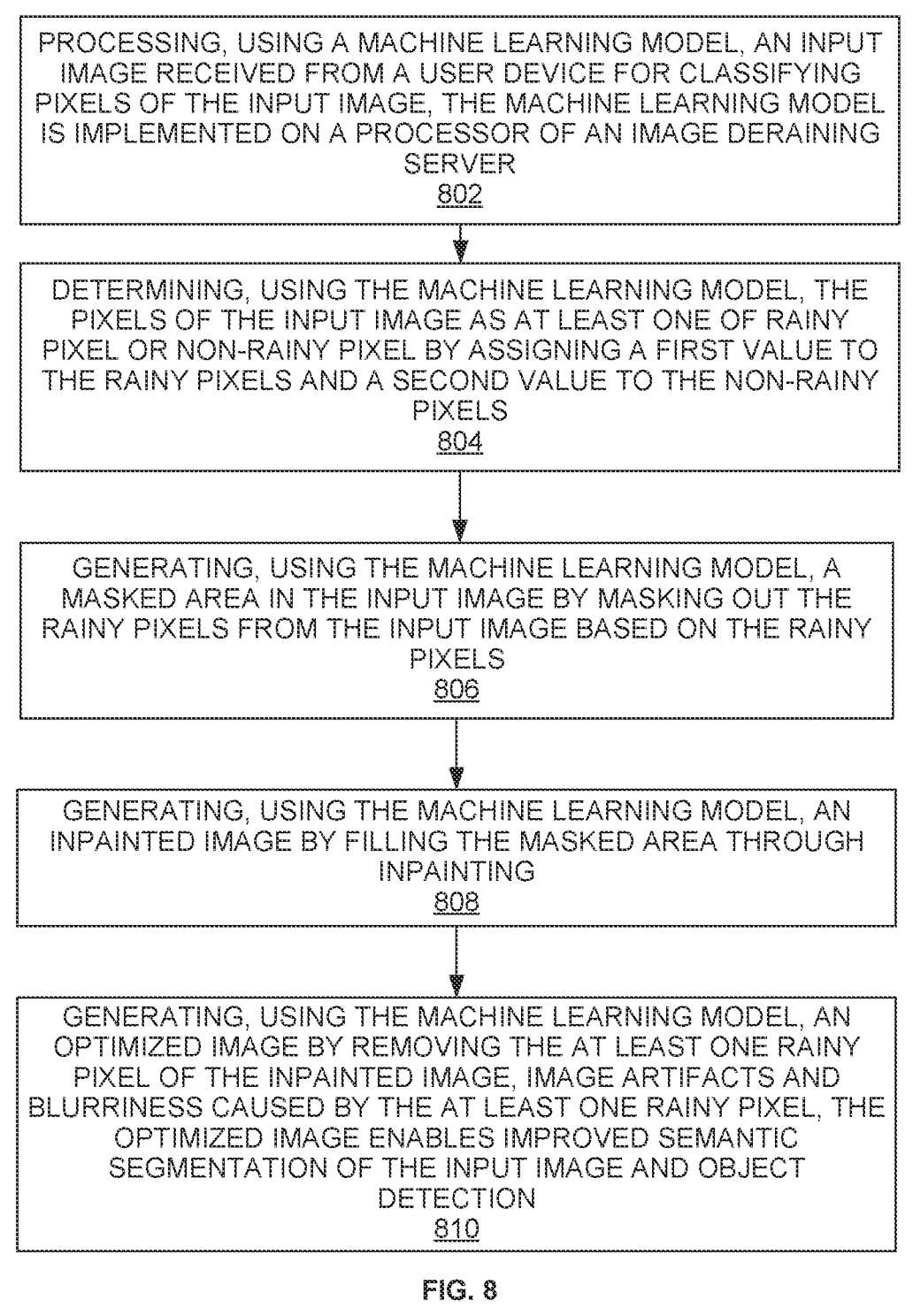

PROCESSING, USING A MACHINE LEARNING MODEL, AN INPUT IMAGE RECEIVED FROM A USER DEVICE FOR CLASSIFYING PIXELS OF THE INPUT IMAGE, THE MACHINE LEARNING MODEL IS IMPLEMENTED ON A PROCESSOR OF AN IMAGE DERAINING SERVER
802

DETERMINING, USING THE MACHINE LEARNING MODEL, THE PIXELS OF THE INPUT IMAGE AS AT LEAST ONE OF RAINY PIXEL OR NON-RAINY PIXEL BY ASSIGNING A FIRST VALUE TO THE RAINY PIXELS AND A SECOND VALUE TO THE NON-RAINY PIXELS
804

GENERATING, USING THE MACHINE LEARNING MODEL, A MASKED AREA IN THE INPUT IMAGE BY MASKING OUT THE RAINY PIXELS FROM THE INPUT IMAGE BASED ON THE RAINY PIXELS
806

GENERATING, USING THE MACHINE LEARNING MODEL, AN INPAINTED IMAGE BY FILLING THE MASKED AREA THROUGH INPAINTING
808

GENERATING, USING THE MACHINE LEARNING MODEL, AN OPTIMIZED IMAGE BY REMOVING THE AT LEAST ONE RAINY PIXEL OF THE INPAINTED IMAGE, IMAGE ARTIFACTS AND BLURRINESS CAUSED BY THE AT LEAST ONE RAINY PIXEL, THE OPTIMIZED IMAGE ENABLES IMPROVED SEMANTIC SEGMENTATION OF THE INPUT IMAGE AND OBJECT DETECTION
810

FIG. 8

SYSTEM AND METHOD FOR GENERATING DERAINED IMAGE USING SELF-SUPERVISED LEARNING MODEL

BACKGROUND

Cross-Reference to Related Applications

This patent application claims priority to pending Indian provisional patent application No. 20/224,1023945 filed on Apr. 22, 2022, the complete disclosures of which, in their entirety, are hereby incorporated by reference

TECHNICAL FIELD

The embodiments herein generally relate to an image deraining method, and more specifically to a system and a method for generating derained images using a self-supervised learning model.

DESCRIPTION OF THE RELATED ART

Image deraining is a technique used to remove rain or other precipitation artifacts from images or videos that were captured in rainy or bad weather conditions. When it rains, water droplets in the atmosphere can scatter and absorb light, creating a visible effect in images or videos captured during the rain. These droplets may appear as small dots or streaks on the image or video, which can obscure the underlying information in the image or video, and make it difficult to extract useful information or perform image analysis tasks. Image deraining techniques aim to remove or reduce the impact of the rain droplets on the image or video, thereby improving the visual quality of the image or video, and making it easier to analyze or process.

Self-supervised methods have shown promising results in denoising and dehazing tasks, where the collection of the paired dataset is challenging and expensive in image deraining techniques. However, these existing methods fail to remove the rain streaks when applied for image deraining tasks. The existing method's poor performance is due to the explicit assumptions: (i) the distribution of noise or haze is uniform and (ii) the value of a noisy or hazy pixel is independent of its neighbors. The rainy pixels are non-uniformly distributed, and it is not necessarily dependent on their neighboring pixels. Hence, the existing self-supervised method needs to have some prior knowledge about rain distribution to perform the deraining task.

In general, deep learning models need to be provided with large-scale datasets to learn a computer vision task. Moreover, applications such as autonomous navigation systems require many paired images across different adverse weather conditions which is an expensive and tedious task. Self-supervised learning methods are introduced to avoid dependency on large-scale labeled datasets. However, the self-supervised methods fail to provide good results for image deraining as rainy pixels might/might not depend on a nearby pixel, and the rainy pixels are not uniformly distributed in the image, unlike haze and noise. Hence, the self-supervised methods require prior knowledge about rain distribution to perform image deraining tasks.

Single image deraining is an existing task of generating rain-free images that have been extensively researched over the past few decades. There are also video-based existing deraining techniques, but single image deraining is more challenging due to temporal information's unavailability. The single deraining methods are divided into two categories: model-based and deep-learning based methods. The model-based methods or non-deep learning methods utilize dictionary learning, prior-based, sparsity-based model, and mixture-model based to get the derained images. However, the methods mentioned above struggle to generalize over variations in rainy streaks. In recent times, deep-learning models have shown state-of-the-art performance in various computer vision tasks due to efficient feature learning and leveraging the advantage of deep-learning models. One existing method proposes a deep network that can detect and remove rain. Later, additional approaches/methods are proposed, which are based on Convolutional Neural Networks (CNN), generative models, and physics-driven models.

However, the methods mentioned earlier tend to fail when tested on real rainy images. Another existing method proposes an efficient semi-supervised approach that uses synthetic rainy pair images and unlabeled real rainy images. This approach, without proper initialization, may lead to suboptimal results. Yet another existing method presents an improved semi-supervised method that uses the Gaussian process to leverage the information from unlabeled real rainy images while training. However, these methods perform poorly in few-shot unsupervised settings as they are sensitive to the training image pairs. This is because the objective function that minimizes the loss between the rainy and clean image pair, enabling learning the textural image information. The semi-supervised method is sensitive to the choice of training samples which is evident from the color shift caused by the choice of the training image.

Another existing method proposes a method to generate images of unseen classes with only a few samples provided at the testing phase. Later, other few-shot generation methods are proposed for face reenactment, interactive video stylization, and font style transfer. However, when trained in a few-shot unsupervised setting, the few-shot methods struggle to minimize the artifacts by adverse weather conditions.

Therefore, there arises a need to address the aforementioned technical drawbacks in existing technologies for a system and a method for generating derained images using self-supervised methods.

SUMMARY

In view of the foregoing, an embodiment herein provides a system for generating a derained image using a self-supervised learning model. The system includes an image deraining server. The image deraining server includes a memory and a processor. The memory includes a database that stores a set of instructions. The processor executes the set of instructions and implements a machine learning model to (i) process an input image received from a user device for classifying pixels of the input image, the input image includes at least one rainy pixel; (ii) classify, using a machine learning model, the pixels of the input image into the at least one rainy pixel or non-rainy pixel s by assigning a first value to the at least one rainy pixel and a second value to the non-rainy pixel; (iii) generate a masked area in the input image by masking out the at least one rainy pixel from the input image based on the first value; (iv) generate an inpainted image by filling the masked area using an image inpainting method; and (v) generate, using the machine learning model, an optimized image by removing the at least one rainy pixel of the inpainted image and remove image artifacts and blurriness caused by the at least one rainy pixel. The optimized image enables an improved semantic segmentation of the input image and an object detection.

In some embodiments, the machine learning model is trained by providing (i) historical rainy images and corresponding non-rainy images and (ii) historical values of pixel intensities of the historical rainy images and corresponding non-rainy images that maps to the at least one rainy pixel or the non-rainy pixel based on a threshold value.

In some embodiments, the machine learning model includes a Probability Estimation Network (PEN), a prior knowledge generation model, and the self-supervised learning model.

In some embodiments, the Probability Estimation Network predicts a pixel-wise rain likelihood in the input image, instead of learning non-rainy pixels to determine the at least one rainy pixel in the input image, the PEN is trained by differentiating the at least one rainy pixel and the non-rainy pixels in the input image based on the threshold value. The prior knowledge generation model includes information about a prior knowledge of rain distribution. The inpainted image acts as the prior knowledge. The self-supervised learning model removes the at least one rainy pixel of the inpainted image, the image artifacts and the blurriness introduced by the at least one rainy pixel using the prior knowledge.

In some embodiments, the machine learning model that is trained estimates the pixel-wise likelihood of rain and provides the rain distribution in the input image. In some embodiments, the inpainted image is obtained in a few-shot setting.

In one aspect, a method for generating a derained image using a self-supervised learning model is provided. The method includes processing, using a machine learning model, an input image received from a user device for classifying pixels of the input image. The machine learning model is implemented on a processor of an image deraining server. The input image comprises at least one rainy pixel. The method includes classifying, using the machine learning model, the pixels of the input image into at least one rainy pixel or non-rainy pixel by assigning a first value to the at least one rainy pixel and a second value to the non-rainy pixel. The method includes generating, using the machine learning model, a masked area in the input image by masking out the at least one rainy pixel from the input image based on the first value. The method includes generating, using the machine learning model, an inpainted image by filling the masked area using an image inpainting method. The method includes generating, using the machine learning model, an optimized image by removing the at least one rainy pixel of the inpainted image and remove image artifacts and blurriness caused by the at least one rainy pixel. The optimized image enables an improved semantic segmentation of the input image and an object detection.

In some embodiments, the machine learning model is trained by providing (i) historical rainy images and corresponding non-rainy images and (ii) historical values of pixel intensities of the historical rainy images and corresponding non-rainy images that maps to the at least one rainy pixel or non-rainy pixel based on a threshold value.

In some embodiments, the method further includes predicting, using a Probability Estimation Network (PEN), a pixel-wise rain likelihood in the input image, instead of learning non-rainy pixels to determine the at least one rainy pixel in the input image, the PEN is trained by differentiating the at least one rainy pixel and the non-rainy pixel in the input image based on the threshold value of the pixel intensity. The method further includes providing, using a prior knowledge generation model, information about prior knowledge of rain distribution. The inpainted image acts as the prior knowledge. The method further includes removing, using a self-supervised learning model, and the prior knowledge, the at least one rainy pixel of the inpainted image, the image artifacts and the blurriness introduced by the image inpainting method.

In some embodiments, the method further includes estimating, using the machine learning model that is trained, the pixel-wise likelihood of rain and providing the rain distribution in the input image. In some embodiments, the inpainted image is obtained in a few-shot setting. In some embodiments, the machine learning model includes the PEN, the prior knowledge generation model and the self-supervised learning model.

In another aspect, one or more non-transitory computer-readable storage mediums configured with instructions executable by one or more processors to cause the one or more processors to perform a method of generating a derained image using a self-supervised learning model is provided. The method includes processing, using a machine learning model, an input image received from a user device for classifying pixels of the input image. The machine learning model is implemented on a processor of an image deraining server. The input image comprises at least one rainy pixel. The method includes classifying, using the machine learning model, the pixels of the input image into at least one rainy pixel or non-rainy pixel by assigning a first value to the at least one rainy pixel and a second value to the non-rainy pixel. The method includes generating, using the machine learning model, a masked area in the input image by masking out the at least one rainy pixel from the input image based on the first value. The method includes generating, using the machine learning model, an inpainted image by filling the masked area using an image inpainting method. The method includes generating, using the machine learning model, an optimized image by removing the at least one rainy pixel of the inpainted image and remove image artifacts and blurriness caused by the at least one rainy pixel. The optimized image enables an improved semantic segmentation of the input image and an object detection.

In some embodiments, the machine learning model is trained by providing (i) historical rainy images and corresponding non-rainy images and (ii) historical values of intensities of pixels of the historical rainy images and corresponding non-rainy images that maps to the rainy or non-rainy pixels based on a threshold value. The trained machine learning model includes a Probability Estimation Network (PEN) that differentiates the at least one rainy pixel and non-rainy pixels in the input image based on the threshold value, a prior knowledge generation model and the self-supervised learning model.

In some embodiments, the method further includes predicting, using the Probability Estimation Network, a pixel-wise rain likelihood in the input image, instead of learning non-rainy pixels to determine the at least one rainy pixel in the input image. The method further includes providing, using the prior knowledge generation model, information about a prior knowledge of rain distribution. The inpainted image acts as the prior knowledge. The method further includes deraining, using the self-supervised learning model using the prior knowledge, the inpainted image and removing image artifacts and blurriness introduced by the image inpainting method.

In some embodiments, the method further includes estimating, using the machine learning model that is trained, the pixel-wise likelihood of rain and providing the rain distribution in the input image. In some embodiments, the inpainted image is obtained in a few-shot setting.

The method is a first data-driven image deraining method in a few-shot setting. The trained machine learning model (e.g., a Probability Estimation Network) estimates the pixel-wise likelihood of rain. The output of trained machine learning model provides prior knowledge about rain distribution to the Self-Supervised Learning model. The method improves semantic segmentation of the input image and object detection compared to existing deraining approaches.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 is a flow diagram that illustrates a method for generating a derained image using a self-supervised learning model according to some embodiments herein.

DETAILED DESCRIPTION OF THE DRAWINGS

Figure 1:
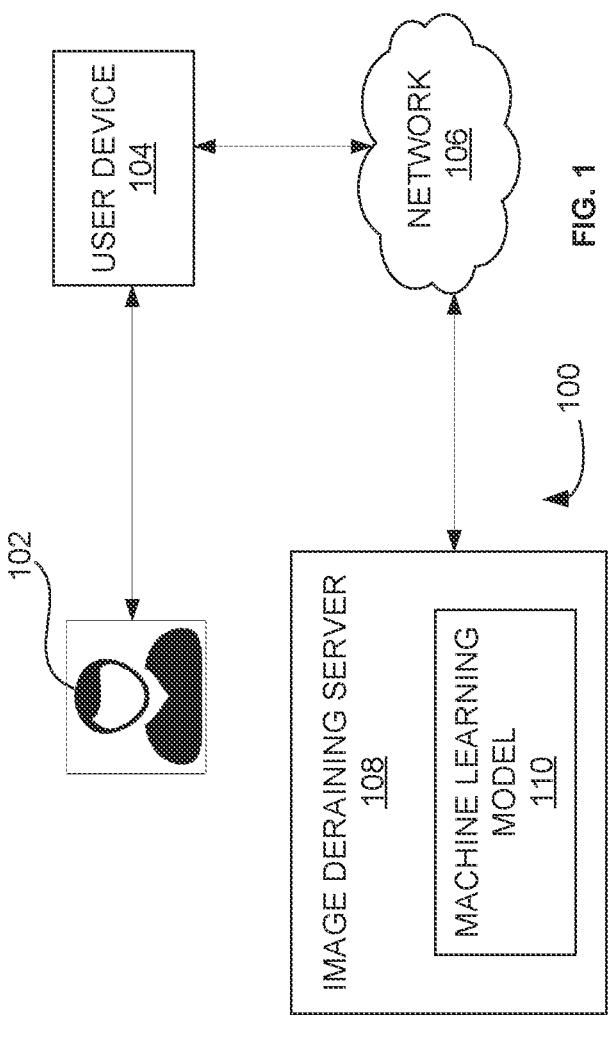
FIG. 1 illustrates a system for generating a derained image using a self-supervised learning model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for generating a derained image using a self-supervised learning model. The embodiments herein achieve this by proposing a system and a method for generating a derained image using a self-supervised learning model according to some embodiments herein. Referring now to the drawings, and more particularly to FIGS. 1 through 9, where similar reference characters denote corresponding features consistently throughout the figures, there are shown preferred embodiments.

Self-supervised learning refers to the learning of visual features from the unlabeled dataset. This framework trains a network to solve the pretext task using the pseudo-labels generated from a dataset without human supervision. The self-supervised learning method uses a pretext task of predicting image patches' relative position, which improves object detection tasks. Later, self-supervised approaches use the pretext tasks such as solving jigsaw puzzles, image rotation estimation, super-resolution, colorization, and inpainting. Recent self-supervised denoising methods such as Noise2Void, Noise2Self, and Noise2Same do not depend on prior noise information for denoising. Although, the availability of noise information further improves the performance, the success of self-supervised models in denoising for image deraining.

FIG. 1 illustrates a system 100 for generating a derained image using a self-supervised learning model 110 according to some embodiments herein. The system includes an image deraining server 108. The image deraining server 108 includes a memory and a processor. The memory includes a database that stores a set of instructions.

The user device 104 receives at least one input image from a user 102. In some embodiments, the user device 104 may be but is not limited to a mobile phone, a tablet, a Personal computer, or a laptop. The user device 104 is communicatively connected to the image deraining server 108 through a network 106. The network may be wired or wireless network. The image deraining server 108 receives the input image from the user device 104 through the network 106. The image deraining server 108 receives an input image from a user device associated with a user. The input image may include at least one rainy pixels, non-rainy pixels, or both. The image deraining is a process of removal of rain from an image. The derained image is the image after the image deraining.

The processor executes the set of instructions and implements a machine learning model 110. The image deraining server 108 processes an input image received from a user device 104 for classifying pixels of the input image. The image deraining server 108 classifies the pixels of the input image into rainy pixels or non-rainy pixels by assigning a first value to the rainy pixels and a second value to the non-rainy pixels. The first value may be zero, one, boolean values, etc. The second value may be zero, one, boolean values, etc.

The rainy pixels may be the pixels that may contain rain. The rainy pixels may be identified based on fluctuations in pixel intensities. The non-rainy pixels may be the pixels that may not contain rain.

The image deraining server 108 generates a masked area in the input image by masking out the rainy pixels from the input image based on the first value and outputs only the non-rainy pixels/region. For example, if the input image is a landscape photo with rain droplets visible on the sky, trees, and grass, the masked area may be a part of the image where the rain droplets are present, i.e., the pixels that make up the droplets may be marked or masked out in this area. For example, if the input image is a video recording of a street during rainfall, the masked area would be the area of the video where rain droplets are present, i.e., the pixels that make up the droplets may be marked or masked out in this area. The masked area may include portions of the road, buildings, and any other objects visible in the video. For example, if the input image is a close-up of a person walking in the rain, the masked area may be the part of the image where rain droplets are visible on the person's clothes, face, and hair.

The image deraining server 108 generates an inpainted image by filling the masked area using an image inpainting method. For example, if the input image is a landscape photo with rain droplets visible on the sky, trees, and grass, the inpainted image may be a version of the photo where the masked area, i.e., the pixels that make up the rain droplets, has been filled in with an approximation of what the original background may look like without the rain droplets. For example, the sky may be blue and the trees and grass may be green, as like in a typical landscape photo. For example, if the input image is a video recording of a street during rainfall, the inpainted image may be a version of the video where the masked area, i.e., the pixels that make up the rain droplets, has been filled in with an approximation of what the original scene may look like without the rain droplets. Hence, the inpainted image include filling in the road with asphalt or concrete, filling in the buildings with their original colors and textures, and so on.

The image deraining server 108 generates an optimized image by deraining the inpainted image and remove image artifacts and blurriness caused by the image inpainting method. The optimized image enables an improved semantic segmentation of the input image and object detection.

The optimized images may significantly improve semantic segmentation of the input image and object detection. In some embodiments, the inpainted image is an image that is inpainted using an image inpainting method. The image inpainting method is a restoration method that is used to remove damage or unwanted objects from an image, in a natural manner. Generally, the restoration methods fill the empty/damaged part of an image using its neighboring pixel statistics. In image deraining, image inpainting method is used to fill the masked area of an image. In some embodiments, rain distribution refers to distribution of rain over pixels of the input image. In some embodiments, in few-shot setting, few samples of rainy and its corresponding clean image pairs are used to train the probability estimation network.

Figure 2:
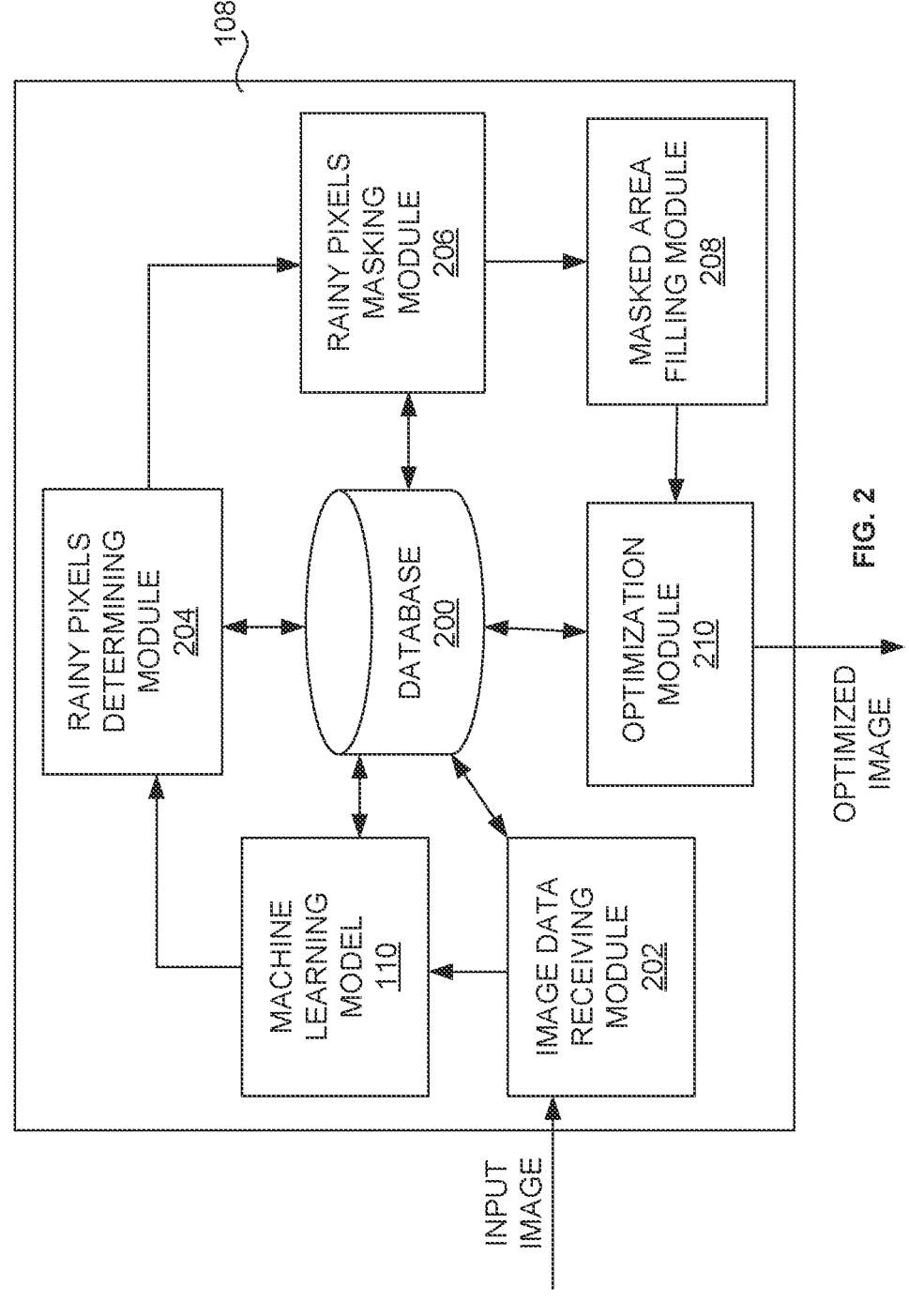
FIG. 2 illustrates a block diagram of an image deraining server of the system of FIG. 1 according to some embodiments herein.

FIG. 2 illustrates a block diagram of an image deraining server 108 of the system 100 of FIG. 1 according to some embodiments herein. The image deraining server 108 includes a database 200, an image data receiving module 202, a machine learning model 110, a rainy pixels determining module 204, a rainy pixels masking module 206, a masked area filling module 208, and an image optimization module 210. The image data receiving module 202 receives an input image from a user device 104 associated with a user 102. The input image may include at least one of rainy pixels, non-rainy pixels, or both. The input image is stored in the database 200. The machine learning model 110 is trained by mapping values of intensities of pixels of historical images to rainy or non-rainy pixels based on a threshold value to obtain a trained machine learning model 110. The rainy pixels determining module 204 determines pixels of the input image into rainy or non-rainy pixels and assigns zero to rainy pixels and one to non-rainy pixels using the trained machine learning model 110. The rainy pixels masking module 206 masks out the rainy pixels to obtain a masked area based on the zero assigned rainy pixels provided by the trained machine learning model 110. The masked area filling module 208 fills the masked area through inpainting to obtain an inpainted image. The image optimization module 210 provides the inpainted image to the trained machine learning model 110 for learning purposes to obtain an optimized image by minimizing artifacts, and tiny rain streaks caused during inpainting.

In some embodiments, the machine learning model 110 is trained by providing (i) historical rainy and corresponding non-rainy images and (ii) historical values of intensities of pixels of the historical rainy images and corresponding non-rainy images that map to the rainy pixels or non-rainy pixels based on a threshold value. For example, synthetic data are used to generate rainy and non-rainy images and this allows for the generation of the intensities or pixel values of rainy and non-rainy images. The trained machine learning model 110 includes a Probability Estimation Network (PEN) that differentiates the rainy and non-rainy pixels in the input image based on the threshold value, a prior knowledge generation model, and a self-supervised learning model. In some embodiments, the trained machine learning model 110 is a self-supervised learning model. The trained machine learning model 110 may provide rain distribution in the input image. In some embodiments, the machine learning model 110 is trained by real and synthetic rainy images.

In some embodiments, the Probability Estimation Network predicts the pixel-wise rain likelihood in the input image, instead of learning non-rainy pixels to determine the rainy pixels in the input image. The prior knowledge generation model includes information about a prior knowledge of rain distribution. The inpainted image acts as the prior knowledge.

The self-supervised learning model derains the inpainted image and removes image artifacts and blurriness introduced by the image inpainting method using the prior knowledge. In some embodiments, an inpainted image acts as the prior knowledge for the Self-supervised learning model for deraining.

In some embodiments, the machine learning model 110 that is trained estimates the pixel-wise likelihood of rain and provides rain distribution in the input image. In some embodiments, the first value that is assigned to the rainy pixel is zero and the second value that is assigned to the non-rainy pixels is one. In some embodiments, the inpainted image is obtained in a few-shot setting. In some embodiments, the image deraining server 108 fills the masked area through the image inpainting method to obtain the inpainted image. The image deraining server 108 provides the inpainted image to the trained machine learning model 110 for learning purposes to obtain an optimized image by minimizing artifacts, and tiny rain streaks caused during inpaintaing.

Figure 3:
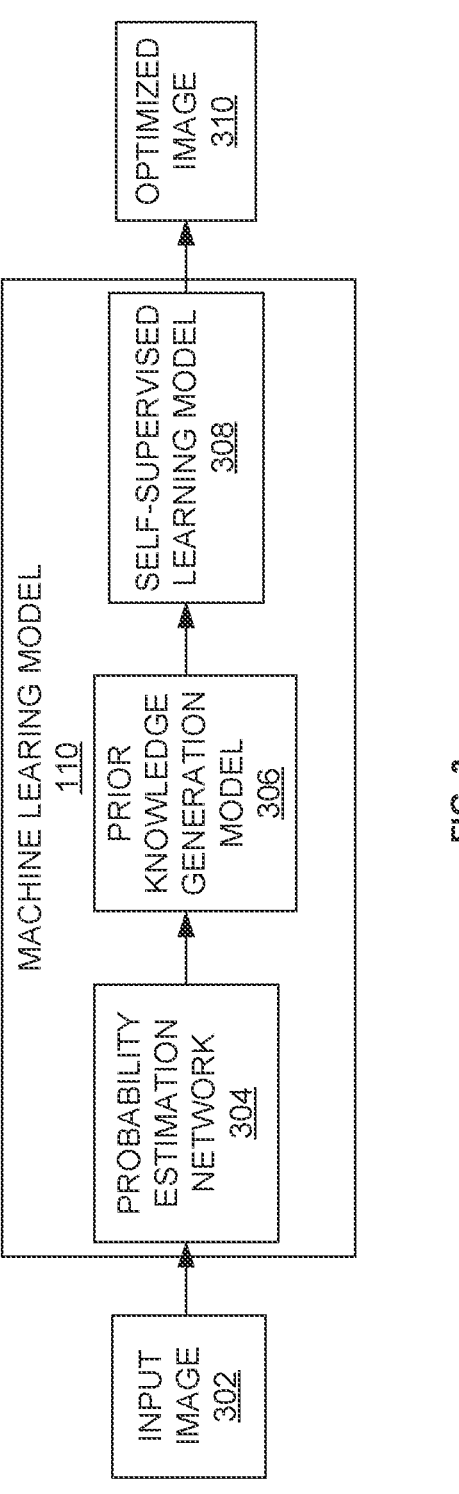
FIG. 3 illustrates a block diagram of a machine learning model of the system of FIG. 1 according to some embodiments herein.

FIG. 3 illustrates a block diagram of a machine learning model 110 of the system 100 of FIG. 1 according to some embodiments herein. The machine learning model 110 includes a Probability Estimation Network (PEN) 304, a prior knowledge generation model 306, and a self-supervised learning model 308. At the first stage, the PEN 304 that is trained in a few-shot setting predicts a pixel-wise rain likelihood in an input image 302. The trained PEN 304 predicts the pixel-wise rain likelihood instead of learning non-rainy pixels. The PEN 304 may learn to predict rainy pixels independent of textural information present in training images. The prior knowledge generation model 306 generates a prior knowledge that has information about prior knowledge of rain distribution.

In the second stage, the trained PEN 304 predicts the pixel-wise rain probability that helps to identify and mask the rainy regions in the input image 302. The masked area is filled using image inpainting to obtain an inpainted image. In some embodiments, the inpainted image acts as a prior knowledge to a self-supervised learning model 308 or a self-supervised network (SSN). In the third stage, the inpainted image is passed to the self-supervised learning model 308. The self-supervised learning model 308 may further derain the image and remove image artifacts and blurriness introduced by image inpainting, with sufficient prior knowledge about the rain distribution, to obtain an optimized image 310.

Figure 4A:
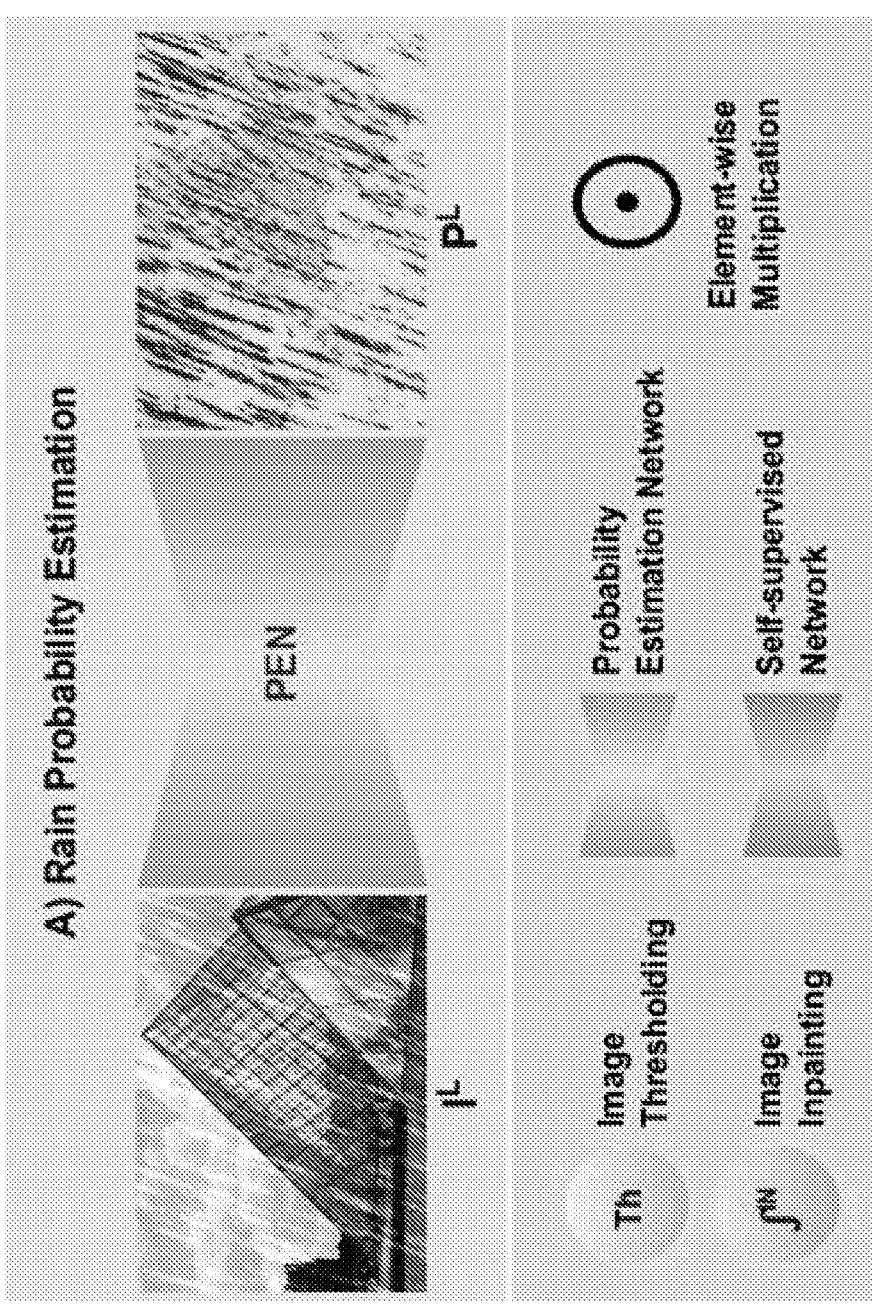
FIGS. 4A-4C illustrate exemplary views of the machine learning model of FIG. 3 according to some embodiments herein.
Figure 4B:
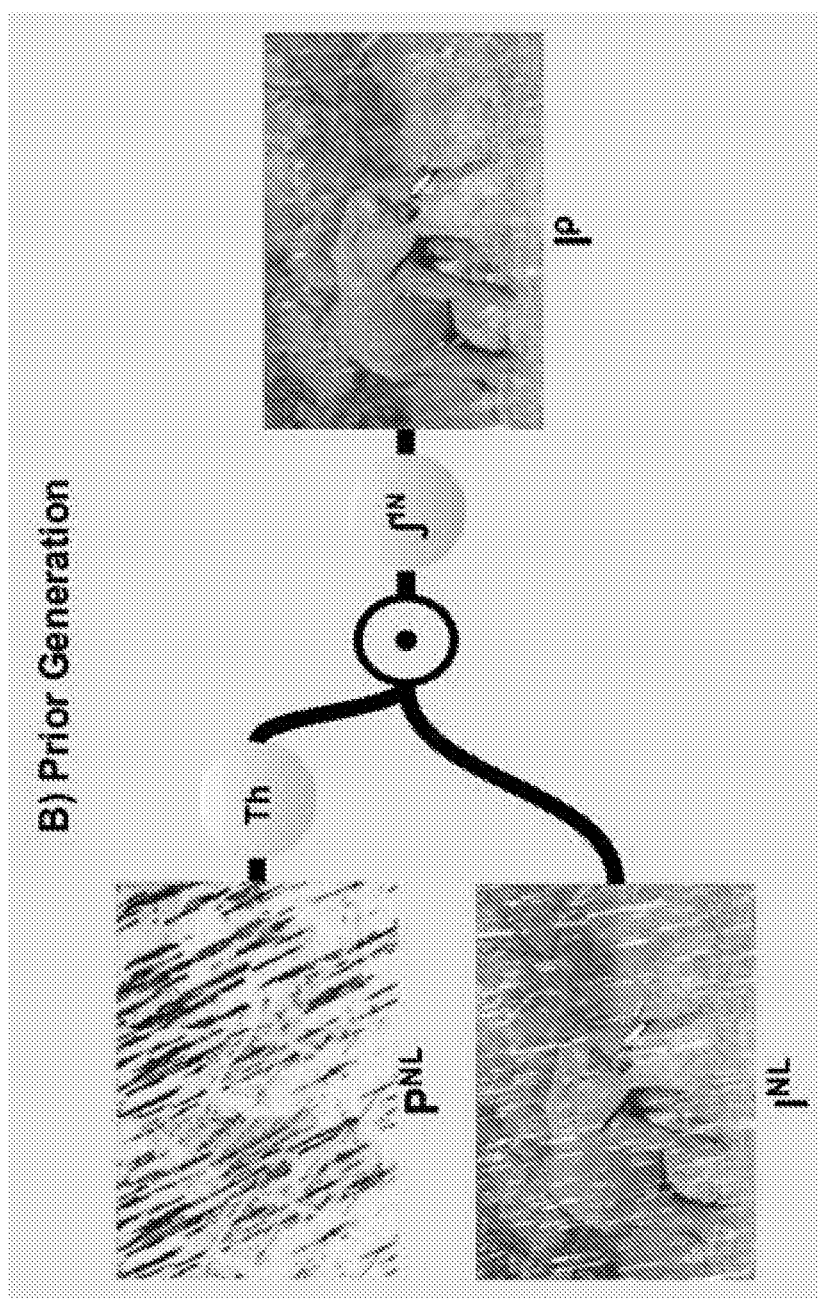
Figure 4C:
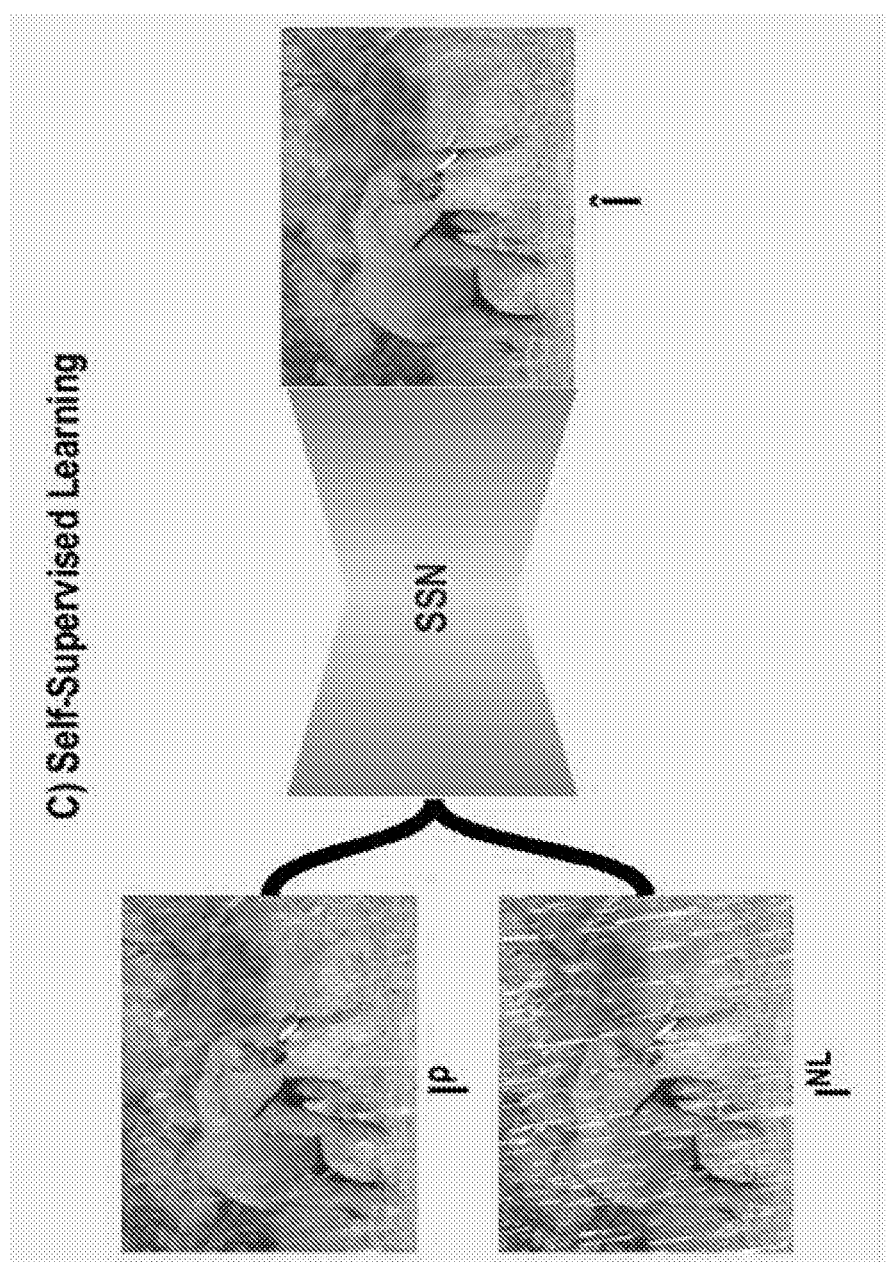

FIGS. 4A-4C illustrate exemplary views of the machine learning model 110 of FIG. 3 according to some embodiments herein. The machine learning model 110 is formulated by a set of input images 302/rainy images: $I^L = \{I_i^L = 1, 2, \ldots, n\}$ and the corresponding optimized images 310/clean images: $I = \{I_i : i = 1, 2, \ldots, n\}$. The value of n in the system 100 is 1, 3, and 5. The unpaired rainy image set without the clean image is denoted by: $I^{NL} = \{I_i^{NL} : i = 1, 2, \ldots, m\}$, where m»n. Firstly, in FIG. 4A, the system 100 trains a Probability Estimation Network (PEN) 304 on I' and I to get the pixel-wise rain probability of an input image 302. The trained PEN network provides pixel-wise rain probability estimation of $I^{NL}$ denoted by $P^{NL}$. In FIG. 4B, the unpaired rainy images $I^{NL}$ are passed to estimate pixel-wise rain probability. The predicted pixel-wise rain probability map values are thresholded (Th) by giving 0 to the rainy pixel and I to the non-rainy pixel. The system 100 performs element-wise multiplication between the $I^{NL}$ and its corresponding thresholded probability map $P^{NL}$. As a result, the rainy regions/pixels are masked out and filled through image inpainting. After that, the inpainted image/output acts as the prior knowledge denoted by $I^P$. The generated labels $I^P$ suffer from image artifacts and blurriness due to image inpainting and have tiny rain streaks that are undetected by PEN 304. Finally, in FIG. 4C, the generated prior knowledge $I^P$ trains the SSN using the self-supervised learning model 308 to minimize such image artifacts introduced by image inpainting and further derain the inpainted image.

Figure 5:
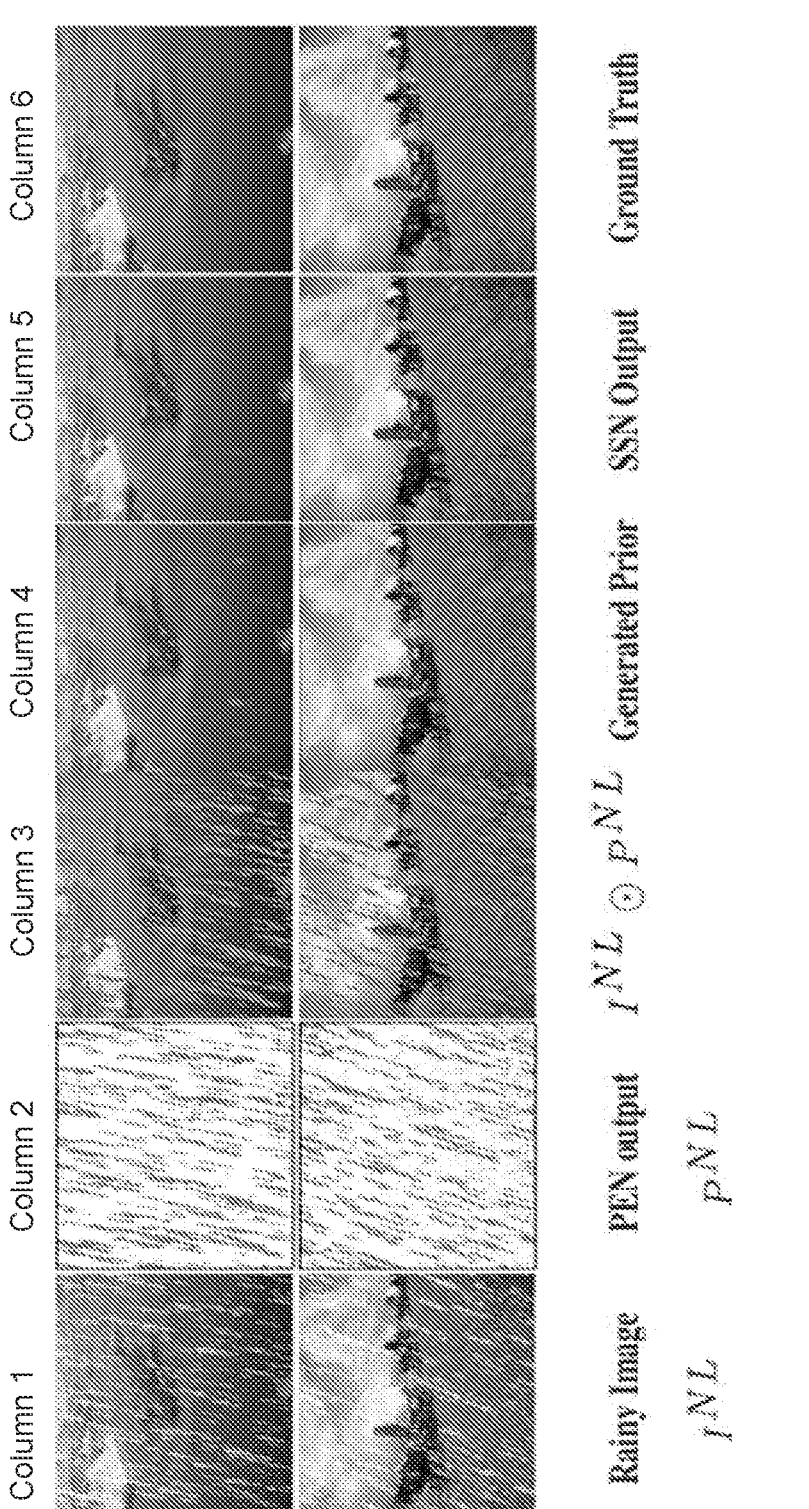
FIG. 5 illustrates an exemplary visualization of image output at various stages of the machine learning model of FIG. 3 according to some embodiments herein.

FIG. 5 illustrates an exemplary visualization of image output at various stages of the machine learning model 110 of FIG. 3 according to some embodiments herein. At the first stage, the Probability Estimation Network (PEN) 304 considers a rainy image $I_i^L$ having pixel value at x to be $I_{i(x)}^L$ and the probability of the pixel being rainy is $P_r(x)$, as shown at column 1 of FIG. 5. In some embodiments, the rainy image may be unpaired image, $I^{NL}$. A function, $f_P$, estimates the conditional probability of the pixel at location x to be rainy given $I_{i(x)}^L$ which is formulated as: $f_P(x) = P_r(x/I_{i(x)}^L)$ (1).

The function $f_P(x)$ is formulated by training a UNet to estimate pixel-wise rain probability. The UNet is trained on binary cross-entropy loss which is given by:

$$lPEN = 1$$

$$l_{PEN} = \frac{1}{N} \sum_{x=1}^{N} P_{i(x)}^L \cdot \log(f_P(x)) + \left(1 - P_{i(x)}^L\right) \cdot \log(1 - f_P(x)),$$

where $P_{i(x)}^L$ represents the given ground truth rain probability of $I_{i(x)}^L$ at location x and Nis the total number of pixel.

The PEN 304 predicts pixel-wise rain likelihood instead of learning non-rainy pixels since rainy streaks are mostly texture less. Hence, the trained PEN 304 may predict rainy pixels independent of textural information present in training images. In some embodiments, data augmentation plays a significant role in improving the rain detection capabilities of PEN across various rain patterns. Column 2 of FIG. 5 shows the rain streaks predicted by PEN 304.

In the second stage, the prior knowledge generation model 306 generates the prior knowledge $I^P$ for the SSN. The unpaired rainy images $I^{NL}$ are passed through the trained PEN 304 to generate pixel-wise rain probability. The output probability map inferred from the PEN 304 is thresholded, th, to 0 for rainy pixels and 1 for non-rainy pixels, which results in $P^{NL}$. The element-wise multiplication is performed between $I^{NL}$ and $P^{NL}$ that masks the rainy regions. Column 3 of FIG. 5 shows the masked image. The masked areas are filled by image inpainting $f^{IN}$ that gives the prior for SSN shown in column 4 of FIG. 5. The entire process can be formulated as: $I^P = f_{IN}(P^{NL} \odot I^{NL})$.

In some embodiments, the system 100 uses a statistical inpainting method for the image inpainting task. The system 100 does use a pre-trained inpainting network for inpainting as they can provide biased results based on a training dataset.

During the third stage, at the Self-Supervised Learning model 308, the generated prior knowledge has blurry regions introduced by image inpainting and has tiny rainy streaks undetected by the PEN 304. Now, the system uses the SSN to improve the quality of prior knowledge and further derained the image to get the final derained image $I^\wedge$. Firstly, the $I^P$ and $I^{NL}$ are passed through the SSN as an input. Next, a mean square loss, $l_{mse}$, between $I^P$ and $I^\wedge$ is calculated to retrieve an average prior knowledge. A total variation loss denoted by $l_{tv}$ is used on $I^\wedge$ to minimize the tiny streaks which are undetected by the PEN 304. The $l_{tv}$ and $l_{mse}$ smoothens the output image which reduces the high frequency detail. Hence, a Visual Geometry Group (VGG) loss denoted by lvgg is used to add high frequency details into $I^\wedge$. The $l_{vgg}$ is calculated using features map denoted by $\phi_{vgg}$ obtained from rectified linear unit (ReLU) activation layers of the pretrained VGG16 network. The final objective is given by:

$$l_{SSN}\left(\left(P_i^{NL}; I_i^{NL}\right), I_i^\wedge\right) = l_{mse} + \lambda_1 l_{tv} + \lambda_2 l_{vgg}$$

And $$l_{SSN}\left(\left(P_i^{NL}; I_i^{NL}\right), I_i^\wedge\right) = \frac{1}{N} \sum_{x=1}^{N} \frac{L_{I^P}}{L_{i(x)}} - I_{i(x)}^\wedge \frac{L}{L_2} +$$
$$\frac{\lambda_1}{N} \sum_{x=1}^{N} L\hat{I}_{i(x)} L_{tv} + \frac{\lambda_2}{M} \sum_{x=1}^{M} L\phi_{vgg}\left(I_{i(x)}^{NL}\right) - \phi_{vgg}(I_{i(x)}) L_2$$

where $I_{i(x)}^P$ and $I_{i(x)}^\wedge$ represent the value of prior knowledge and its corresponding SSN output at pixel x, respectively. M denotes $\phi_{vgg}$ dimension. $\lambda_1$ and $\lambda_2$ are the hyperparameter empirically estimated during the network's training. Column 5 of FIG. 5 shows the SSN output.

Figure 6:
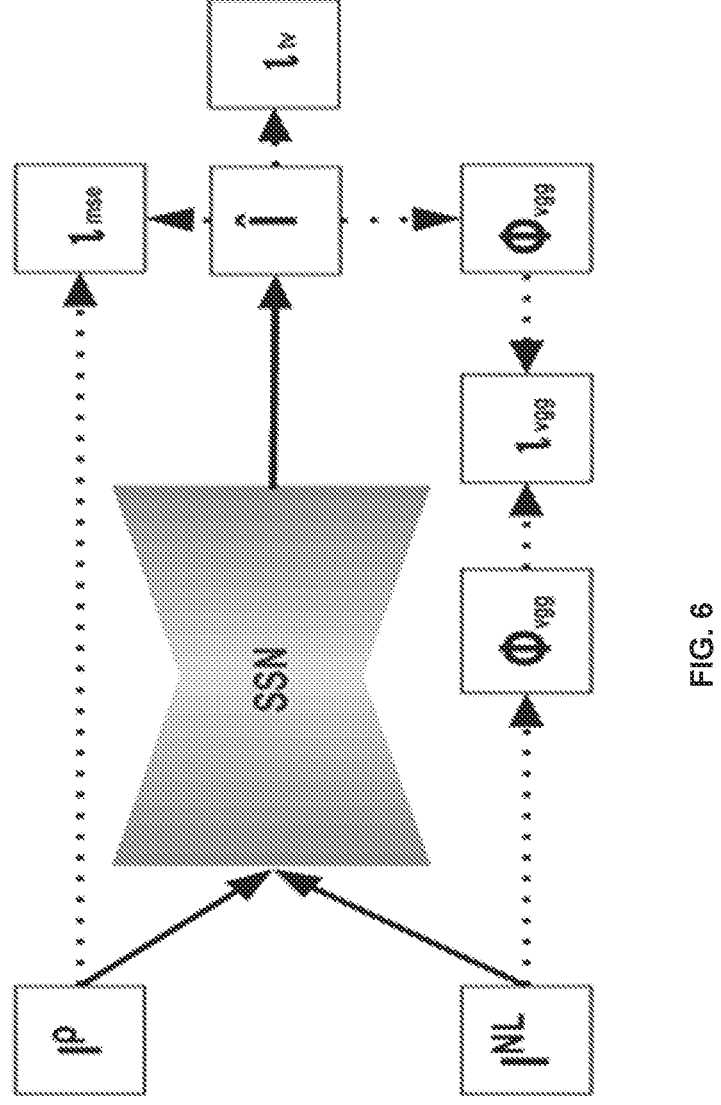
FIG. 6 illustrates a flow of input and output to the Self-Supervised Network (SSN) of FIG. 5 along with various training losses according to some embodiments herein.

FIG. 6 illustrates a flow of input and output to the self-supervised network (SSN) of FIG. 5 along with various training losses according to some embodiments herein. The SSN is trained on a combination of three losses that are $l_{mse}$, $l_{tv}$, and $l_{mse}$. The Ime is used to get the average content of prior knowledge $I^P$. The $1_{t_v}$ is then used to minimize the small rainy streaks. The $1_{vgg}$ is used to improve the high frequency information in the output image $I^C$. The dotted line represents the flow of input to a loss function, and the solid line shows the flow of input and output to the SSN.

Figure 7A:
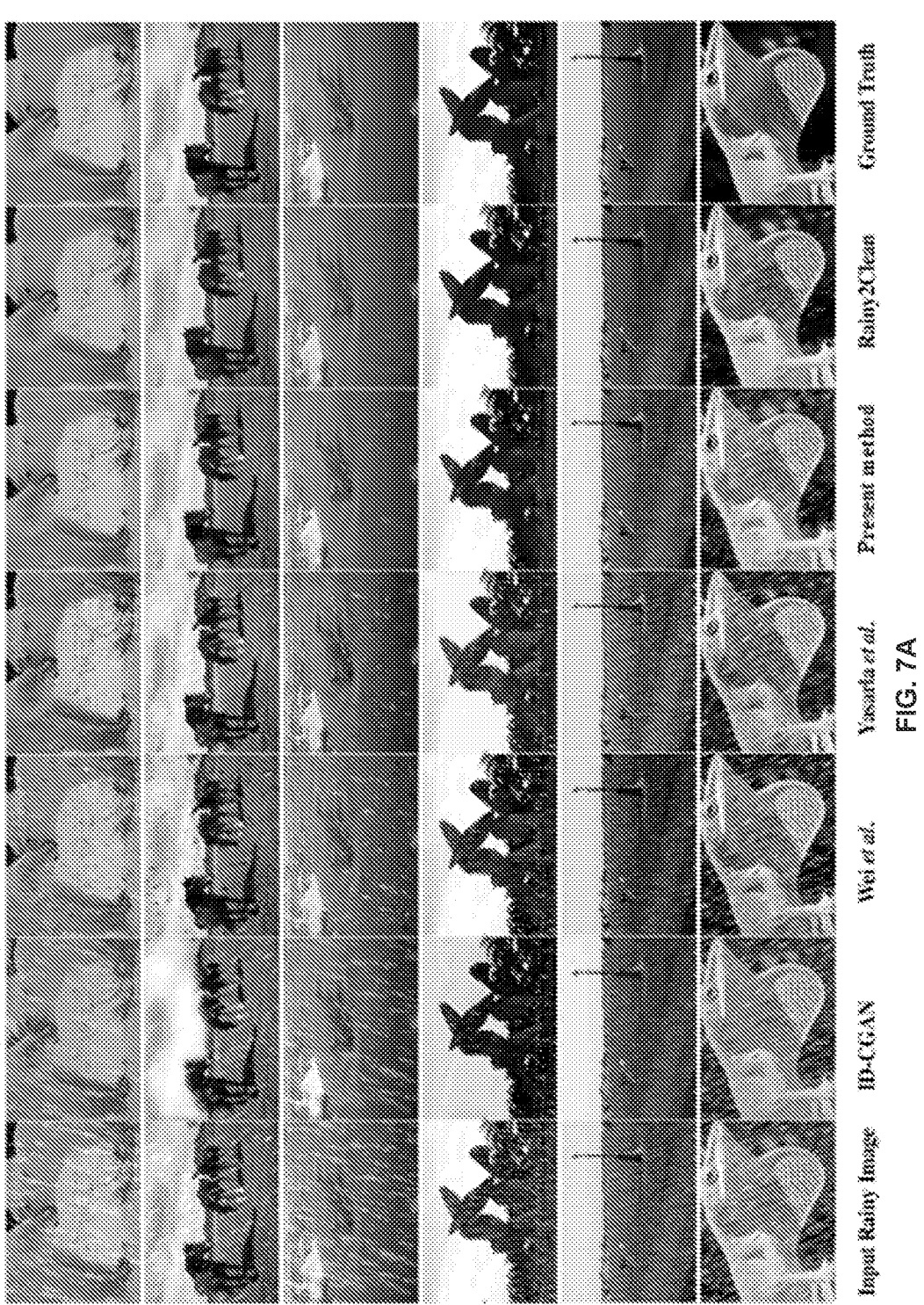
FIGS. 7A-7B illustrate qualitative and quantitative comparison of the system with image deraining methods and with few-shot image-to-image translation methods according to some embodiments herein.
Figure 7B:
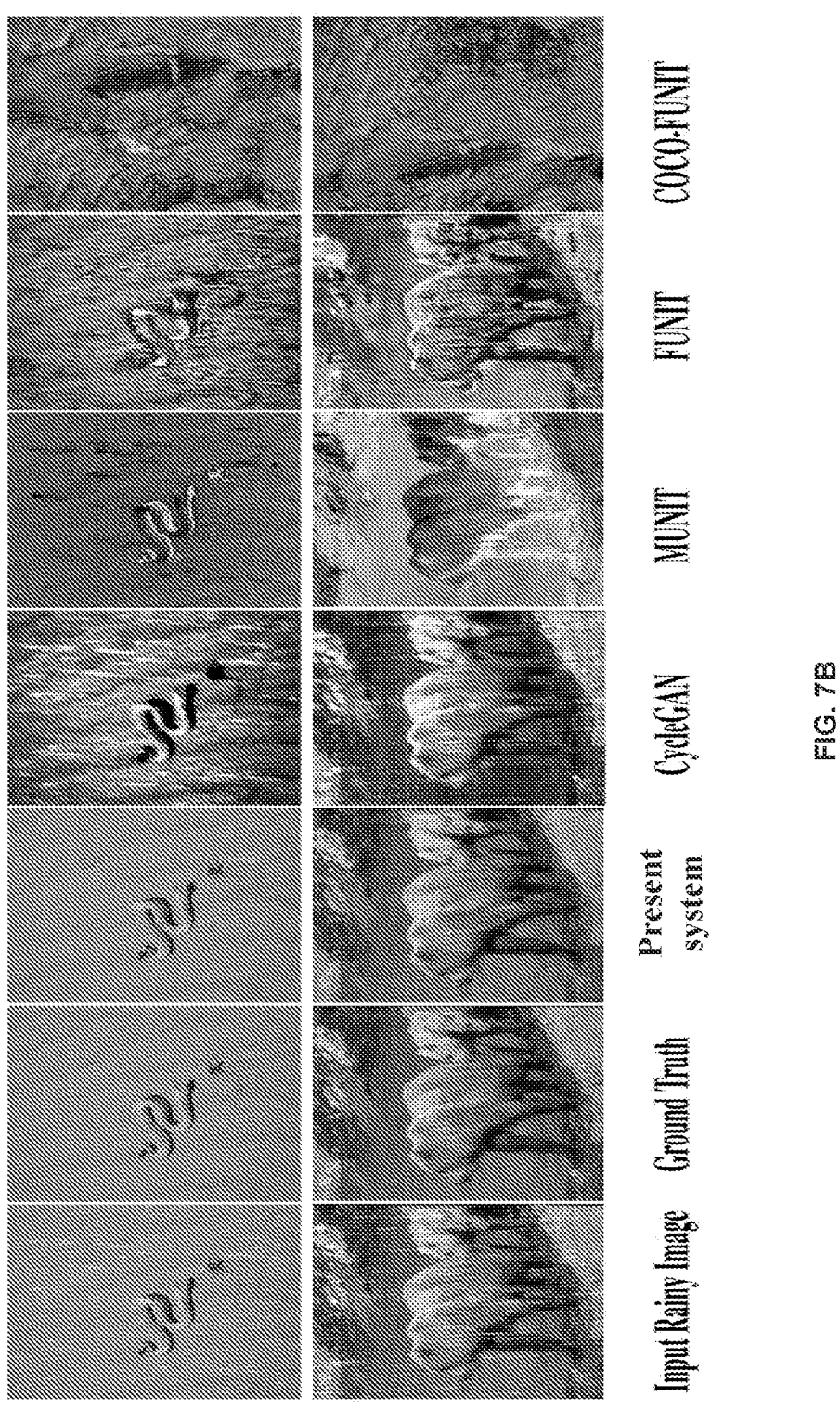

FIGS. 7A-7B illustrate qualitative and quantitative comparison of the system 100 with image deraining methods and with few-shot image-to-image translation methods according to some embodiments herein. The efficacy of the system 100 is evaluated on Rain 100L and DDN-SIRR datasets having real and synthetic rainy images. The figure shows an extensive qualitative and quantitative comparison with image deraining methods and with few-shot image-to-image translation methods. The experiments are obtained on Rain 100L, DDN-SIRR, and Rainy Cityscapes datasets. In Rain 100L dataset, the dataset was synthesized using the rain streak rendering method by Garg et al. on the clean images of BSD200. It includes 200 pairs of training images and 100 pairs of test images. The training image pairs are divided into two parts for the experiments, that is, S image pairs for training and 195 image pairs for validation.

In DDN-SIRR dataset, the dataset includes synthetic rainy and rain-free image pairs and unpaired natural rainy images created by Wei et al. The rain-free images are taken from the UCID dataset. The synthetic dataset is used in the experiments by randomly choosing five image pairs for training and 400 image pairs for validation and testing. Further, the trained model is tested on a set of 100 real rainy images having dense and sparse rain streaks. In the rainy Cityscapes dataset, Halder et al. propose a physics based rain rendering method to inject rain into the clean images realistically. Using this physics based rain rendering method, a rainy cityscapes dataset consisting of rain and rain-free images of Cityscapes is created. This dataset is used to show improvement in semantic segmentation. Five training image pairs, 300 validation image pairs, and 200 image pairs are randomly chosen for the test. Peak Signal-to-Noise Ratio (PSNR) and Structural Similarity Index Measure (SSIM) are used as evaluation metrics to evaluate the performance of deraining methods for the synthetic datasets as the ground truth is available. For natural rainy images, a Blind/Reference less Image Spatial Quality Evaluator (BRISQUE) is used.

The PEN 304 is trained on twenty thousand epochs with batch size 1. The initial learning rate is 1e-4, which is reduced to 1e-5 after ten thousand epochs. The SSN is trained for 500 epochs with a learning rate of 1e-3 and a batch size of 16. While training both the networks, the input is provided by randomly cropping 128×128 image patch, which is randomly rotated between (−180°, 180°). The values of $\lambda_1$ and $\lambda_2$ are empirically found best to be 1e-3 and 0.04. The value of threshold (Th) is used to be 0.95.

The system 100 performance with a) fewshot/unsupervised/supervised image-to-image translation methods and b) semi/fully supervised deraining methods are compared. The experiments are performed in all the methods in a few-shot unsupervised setting for a fair comparison, i.e., only a few rainy/clean image pairs are provided, rest are unpaired during training.

The present system 100 performance is compared with (i) supervised such as Pix2Pix, (ii) unsupervised such as UNIT, CycleGAN, and MUNIT, and (iii) few-shot such as FUNIT and COCO-FUNIT image-to-image translation methods. Then, the present system is baselined with semisupervised deraining methods proposed by Wei et al. and Yasarla et al. The supervised deraining methods of ID, CNN, DSC, LP, DerainDrop, SPANet, RESCAN, and IDCGAN are trained as the method baselines for the system 100. An upper-bound baseline Rainy2Clean is created by training the SSN network with full supervision. Rainy2Clean shows deraining results when the entire dataset is accessed.

From the results shown in Table 1, the present method executed by the system 100 outperforms the image-to-image translation methods with Pix2Pix, UNIT, CycleGAN, MUNIT, FUNIT, and COCO-FUNIT. The qualitative results in FIG. 7B show that the present method executed by the system 100 may minimize the rain streaks, whereas the baselined methods suffer from image artifacts. The table 2 shows the performance comparison of the present method with the supervised methods such as ID, CNN, DSC, LP, DerainDrop, SPANet, RESCAN, and ID-CGAN trained on Rain 100L dataset. From the table 2 (row: 1-4, and 9), the present method trained only on 5-shot setting achieves better PSNR compared to initial deraining methods: ID, CNN, DSC, and LP which are trained on the entire dataset. From the Table 2 (row: 5-9), the present method significantly outperforms recent deraining methods such as DerainDrop, SPANet, RESCAN, and ID-CGAN in S-shot setting. Quantitatively, 8.21/0.18 PSNR/SSIM gain is obtained over the best supervised method.

TABLE 1

Quantitative comparison of the present method with image-to-image translation methods in 1-shot unsupervised setting.

| Method | PSNR/SSIM |
|---|---|
| UNIT (NIPS' 17) | 7.80/0.053 |
| Pix2Pix (ICCV' 17) | 10.73/0.14 |
| COCO-FUNIT (ECCV' 20) | 10.73/0.14 |
| FUNIT (ICCV' 19) | 15.79/0.40 |
| MUNIT (ECCV' 19) | 15.79/0.40 |
| CycleGAN (CVPR' 17) | 16.64/0.49 |
| Present method | 23.87/0.77 |

TABLE 2

Result comparison of deraining method with the present method on Rain 100 L dataset.

| | Method | PSNR/SSIM |
|---|---|---|
| Trained on full training dataset | ID (TIP' 12) | 23.13/0.70 |
| | CNN (ICCV' 13) | 23.70/0.81 |
| | DSC (ICCV' 15) | 24.16/0.87 |
| | LP (CVPR' 16) | 25.91/0.89 |
| Trained in 5-shot unsupervised setting | DerainDrop (CVPR' 18) | 15.69/0.53 |
| | RESCAN (ECCV' 18) | 17.44/0.59 |
| | SPANet (CVPR' 19) | 18.46/0.65 |
| | ID-CGAN (TCSVT' 19) | 18.66/0.68 |
| | Present method | 26.87/0.86 |

Further, the present method is compared with Wei et al., Yasarla et al., RESCAN, ID-CGAN, and Rainy2Clean on the test set of Rain 100L and DDN-SIRR dataset in 1-shot, 3-shot, and 5-shot setting. FIG. 7A and Table 3 shows the qualitative and quantitative results. The present method is observed that it outperforms the other deraining methods in the few-shot settings. The semi-supervised methods struggle to remove the rain and cannot retain the input image statistics. This is because of the poor latent representation learned by their supervised networks. The visual results of fully supervised methods are lower than semi-supervised methods as they do not have the choice to improve their latent representation of their model using real rainy images. Table 4 shows the present method's performance on real rainy images of the DDN-SIRR dataset trained in the 5-shot setting and the method acts more effectively in removing the rain streaks than Rainy2Clean.

TABLE 3

Quantitative comparison (PSNR/SSIM)

| Dataset | RESCAN (ECCV'18) | ID-CGAN (TCSVT'19) | Wei et al. (CVPR'19) | Yasarla et al. (CVPR'20) | Present method | Rainy2Clean (Upper-Bound) |
|---|---|---|---|---|---|---|
| | | | Rain 100 L [1 Shot] | | | |
| Val | 16.51/0.5676 | 17.64/0.6619 | 21.49/0.7117 | 22.81/0.7298 | 24.31/0.8156 | — |
| Test | 16.37/0.5510 | 17.01/0.6391 | 20.94/0.7021 | 22.26/0.7229 | 23.87/0.7724 | 27.52/0.9180 |
| | | | Rain 100 L [3 Shot] | | | |
| Val | 17.32/0.5800 | 17.93/0.6707 | 22.62/0.7269 | 23.01/0.7604 | 25.79/0.8317 | — |
| Test | 16.91/0.5772 | 17.48/0.6544 | 22.17/0.7195 | 22.42/0.7596 | 25.54/0.8260 | 27.52/0.9180 |
| | | | Rain 100 L [5 Shot] | | | |
| Val | 18.07/0.6035 | 19.37/0.6965 | 23.91/0.7811 | 23.97/0.7832 | 26.97/0.8643 | — |
| Test | 17.44/0.5993 | 18.66/0.6821 | 23.77/0.7751 | 23.59/0.7703 | 26.87/0.8615 | 27.52/0.9180 |
| | | | DDN-SIRR [1 Shot] | | | |
| Val | 14.38/0.4631 | 16.11/0.5530 | 18.73/0.6013 | 19.51/0.6313 | 21.92/0.6808 | — |
| Test | 11.35/0.3173 | 15.30/0.5127 | 17.26/0.5849 | 19.65/0.6512 | 21.83/0.6781 | 24.13/0.7802 |
| | | | DDN-SIRR [3 Shot] | | | |
| Val | 16.70/0.5427 | 18.69/0.5962 | 19.51/0.6257 | 20.74/0.6537 | 22.23/0.6918 | — |
| Test | 16.58/0.5639 | 18.13/0.6159 | 19.34/0.6381 | 20.09/0.6485 | 21.97/0.6749 | 24.13/0.7802 |
| | | | DDN-SIRR [5 Shot] | | | |
| Val | 17.72/0.5843 | 19.07/0.6287 | 20.88/0.6517 | 21.08/0.6709 | 22.27/0.6992 | — |
| Test | 17.34/0.5702 | 18.82/0.6119 | 20.16/0.6449 | 20.84/0.6667 | 22.07/0.6841 | 24.13/0.7802 |

TABLE 4

Performance evaluation on real rainy images (DDN-SSIR). BRISQUE Score (↓) indicates lower the score better the performance.

| Method | BRISQUE Score (↓) |
|---|---|
| Rainy Image | 32.28 |
| Yasarla et al. | 31.93 |
| Present method | 30.67 |
| Rainy2Clean | 27.89 |

The effectiveness of using SSN in the present method is investigated by defining various methods with different losses, where, w/o SSN represents train without SSN, $M^1$ represents train with SSN on $I_{mse}$, $M^2$ represents train with SSN on $I_{mse}$ and $1_{tv}$, w/SSN represents train with SSN on $1_{mse}$, $1_{tv}$, and $1_{vgg}$. All the methods are trained on Rain 100L dataset and the results are presented in Table 5. It is observed that w/SSN shows the best performance demonstrating the effectiveness of the combination of loss used in SSN and the w/SSN can minimize the image artifacts due to image inpainting and the rain streaks that are undetected by PEN.

TABLE 5

Ablative study on SSN: Shows incremental improvement by adding SSN with $1_{mse}$, $1_{tv}$, and $1_{vgg}$.

| Method | Loss | PSNR |
|---|---|---|
| w/o SSN | n/a | 22.91 |
| $M^1$ | lmse | 23.17 |
| $M^2$ | | 23.38 |
| w/SSN | lmse + Itv~1~^vgg | 23.87 |

The present method's performance consistency is demonstrated irrespective of the training pair in a 1-shot setting.

The three pairs of rainy and rainfree images are randomly chosen from the Rain 100L dataset. The Yasarla et al. struggles to remove rain and retain the input image statistics that can be prominently observed in the Pair 3 result. The reason behind the decreased performance is Yasarla et al. rely on a large number of paired rain and rain-free images to learn its hidden representation. The learned hidden representation is further refined by using real-world images. Since the model has only access to a single training pair, it cannot learn robust hidden representation for deraining. In contrast, the present method shows steady performance across all the training image pairs as shown in Table 6 quantitatively.

TABLE 6

Quantitative generalization performance: It shows the consistent quantitative performance (PSNR) of the present method on Rain 100 L dataset trained on different training image pairs.

| | Yasarla et al. | Present method | Rainy2Clean |
|---|---|---|---|
| Pair 1 | 19.08 | 23.87 | 27.52 |
| Pair 2 | 20.91 | 23.62 | 27.52 |
| Pair 3 | 16.59 | 24.07 | 27.52 |

The present method improves computer vision tasks such as semantic segmentation and object detection critical for autonomous applications.

The experiments performed on multiple datasets contain natural and synthetic images to show the present method's deraining ability. The ablation study establishes that the present method's performance is consistent irrespective of the choice of the training samples. The derained images used from the present method significantly improve semantic segmentation and object detection compared to existing deraining approaches.

FIG. 8 is a flow diagram that illustrates a method 800 for generating a derained image using a self-supervised learning model according to some embodiments herein. At step 802 the method includes processing, using a machine learning model, an input image received from a user device for classifying pixels of the input image. The machine learning model is implemented on a processor of an image deraining server. The input image comprises at least one rainy pixel. At step 804 the method includes classifying, using the machine learning model, the pixels of the input image into at least one rainy pixel or non-rainy pixel by assigning a first value to the at least one rainy pixel and a second value to the non-rainy pixel. At step 806 the method includes generating, using the machine learning model, a masked area in the input image by masking out the at least one rainy pixel from the input image based on the first value. At step 808 the method includes generating, using the machine learning model, an inpainted image by filling the masked area using an image inpainting method. At step 810, the method includes generating, using the machine learning model, an optimized image by removing the at least one rainy pixel of the inpainted image and remove image artifacts and blurriness caused by the at least one rainy pixel.

In some embodiments, the machine learning model 110 is trained by providing (i) historical rainy images and corresponding non-rainy images and (ii) historical values of intensities of pixels of the historical rainy images and corresponding non-rainy images that map to the rainy pixels or the non-rainy pixels based on a threshold value. The trained machine learning model includes a Probability Estimation Network (PEN) 304 that differentiates the rainy pixels and the non-rainy pixels in the input image based on the threshold value, a prior knowledge generation model 306, and the self-supervised learning model 308.

In some embodiments, the method further includes predicting, using the Probability Estimation Network 304, a pixel-wise rain likelihood in the input image 302, instead of learning non-rainy pixels to determine the rainy pixels in the input image 302. The method further includes providing, using the prior knowledge generation model 306, information about prior knowledge of rain distribution. The inpainted image acts as the prior knowledge. The method further includes deraining, using the self-supervised learning model 308 using the prior knowledge, the inpainted image and removing image artifacts and blurriness introduced by the image inpainting method.

In some embodiments, the method further includes estimating, using the machine learning model 110 that is trained, the pixel-wise likelihood of rain and providing the rain distribution in the input image 302. In some embodiments, the first value that is assigned to the rainy pixels is zero and the second value that is assigned to the non-rainy pixels is one. In some embodiments, the inpainted image is obtained in a few-shot setting.

Figure 9:
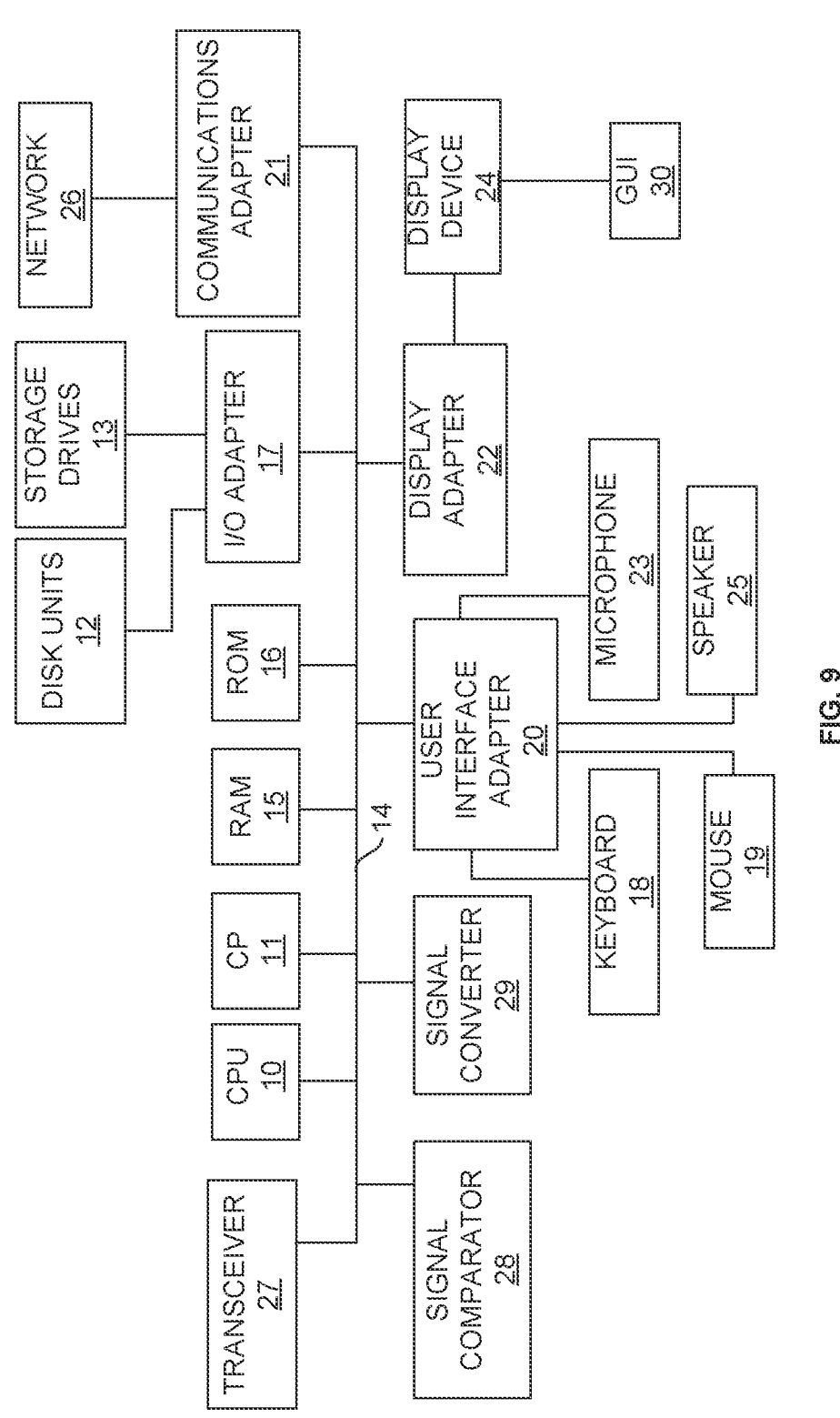
FIG. 9 is a schematic diagram of a computer architecture in accordance with the embodiments herein.

A representative hardware environment for practicing the embodiments herein is depicted in FIG. 9, with reference to FIGS. 1 through 8. This schematic drawing illustrates a hardware configuration of an image deraining server 108/computer system/image capturing device in accordance with the embodiments herein. The image capturing device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The image capturing device can read the inventive instructions on the program storage devices and follow these instructions to execute the methodology of the embodiments herein. The image capturing device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for generating a derained image using a self-supervised leaning model, comprising:
an image deraining server that comprises
a memory that comprises a database that stores a set of instructions;
a processor that executes the set of instructions and to process an input image received from a user device for classifying pixels of the input image, wherein the input image comprises at least one rainy pixel;
classify, using a machine learning model, the pixels of the input image into the at least one rainy pixel or non-rainy pixel by assigning a first value to the at least one rainy pixel and a second value to the non-rainy pixel based on a pixel intensity, wherein the machine learning model is trained by providing (i) historical rainy images and corresponding non-rainy images and (ii) historical values of pixel intensities of the historical rainy images and corresponding non-rainy images that maps to the at least one rainy pixel or the non-rainy pixel based on a threshold value of the pixel intensity;
predict, using a probability estimation network (PEN), a pixel-wise rain likelihood in the input image, instead of learning non-rainy pixels to determine the at least one rainy pixel in the input image, wherein the PEN is trained by differentiating the at least one rainy pixel and the non-rainy pixel in the input image based on the threshold value of the pixel intensity;
remove, using a self-supervised learning model based on prior knowledge of rain distribution, the at least one rainy pixel of an inpainted image, and image artifacts and blurriness introduced by the at least one rainy pixel;

generate a masked area in the input image by masking out the at least one rainy pixel from the input image based on the first value;

generate the inpainted image by filling the masked area using an image inpainting method, wherein the inpainted image acts as the prior knowledge; and generate, using the machine learning model, an optimized image by removing the at least one rainy pixel of the inpainted image and remove image artifacts and blurriness caused by the at least one rainy pixel, wherein the optimized image enables an improved semantic segmentation of the input image and an object detection.

2. The system of claim 1, comprising a prior knowledge generation model that comprises information about the prior knowledge of rain distribution.

3. The system of claim 2, wherein the machine learning model comprises the PEN, the prior knowledge generation model and the self-supervised learning model.

4. The system of claim 1, wherein the machine learning model that is trained estimates a pixel-wise likelihood of rain and provides a rain distribution in the input image.

5. The system of claim 1, wherein the inpainted image is obtained in a few-shot setting.

6. A method for generating a derained image using a self-supervised learning model, comprising:

processing, using a machine learning model, an input image received from a user device for classifying pixels of the input image, wherein the input image comprises at least one rainy pixel, wherein the machine learning model is implemented on a processor of an image deraining server;

classifying, using the machine learning model, the pixels of the input image into the at least one rainy pixel or non-rainy pixel by assigning a first value to the at least one rainy pixel and a second value to the non-rainy pixel based on a pixel intensity, wherein the machine learning model is trained by providing (i) historical rainy images and corresponding non-rainy images and (ii) historical values of pixel intensities of the historical rainy images and corresponding non-rainy images that maps to the at least one rainy pixel or the non-rainy pixel based on a threshold value of the pixel intensity;

predicting, using a probability estimation network (PEN), a pixel-wise rain likelihood in the input image, instead of learning non-rainy pixels to determine at least one rainy pixel in the input image, wherein the PEN is trained by differentiating the at least one rainy pixel and the non-rainy pixel in the input image based on the threshold value of the pixel intensity;

removing, using a self-supervised learning model, and a prior knowledge of rain distribution, the at least one rainy pixel of an inpainted image, and image artifacts and blurriness introduced by an image inpainting method;

generating, using the machine learning model, a masked area in the input image by masking out the at least one rainy pixel from the input image based on the first value;

generating, using the machine learning model, an inpainted image by filling the masked area using the image inpainting method, wherein the inpainted image acts as the prior knowledge; and generating, using the machine learning model, an optimized image by removing the at least one rainy pixel of the inpainted image, image artifacts and blurriness caused by the at least one rainy pixel, wherein the optimized image enables an improved semantic segmentation of the input image and an object detection.

7. The method of claim 6, wherein the method further comprises, providing, using a prior knowledge generation model, information about the prior knowledge of rain distribution.

8. The system of claim 7, wherein the machine learning model comprises the PEN, the prior knowledge generation model and the self-supervised learning model.

9. The method of claim 6, wherein the method further comprises estimating, using the machine learning model that is trained, the pixel-wise likelihood of rain and providing the rain distribution in the input image.

10. One or more non-transitory computer readable storage mediums configured with instructions executable by one or more processors to cause the one or more processors to perform a method of generating a derained image using a self-supervised learning model, comprising:

processing, using a machine learning model, an input image received from a user device for classifying pixels of the input image, wherein the input image comprises at least one rainy pixel, wherein the machine learning model is implemented on a processor of an image deraining server;

classifying, using the machine learning model, the pixels of the input image into the at least one rainy pixel or non-rainy pixel by assigning a first value to the at least one rainy pixel and a second value to the non-rainy pixel based on a pixel intensity, wherein the machine learning model is trained by providing (i) historical rainy images and corresponding non-rainy images and (ii) historical values of intensities of pixels of the historical rainy images and corresponding non-rainy images that maps to the rainy pixels or non-rainy pixels based on a threshold value of the pixel intensity, wherein the trained machine learning model comprises a Probability Estimation Network (PEN) that differentiates the rainy pixels and non-rainy pixels in the input image based on the threshold value, a prior knowledge generation model and the self-supervised learning model;

predicting, using the PEN, a pixel-wise rain likelihood in the input image, instead of learning non-rainy pixel to determine the at least one rainy pixel in the input image;

removing, using a self-supervised learning model using the prior knowledge, of at least one rainy pixel of an inpainted image, and image artifacts and blurriness introduced by an image inpainting method;

generating, using the machine learning model, a masked area in the input image by masking out the at least one rainy pixel from the input image based on the first value;

generating, using the machine learning model, the inpainted image by filling the masked area using the image inpainting method, wherein the inpainted image acts as the prior knowledge; and generating, using the machine learning model, an optimized image by removing the at least one rainy pixel of the inpainted image and remove image artifacts and blurriness caused by the at least one rainy pixel, wherein the optimized image enables an improved semantic segmentation of the input image and an object detection.

11. The one or more non-transitory computer readable storage mediums storing the one or more sequences of instructions of claim 10, which when executed by the one or more processors, further causes providing, using the prior knowledge generation model, information about a prior knowledge of rain distribution.

12. The one or more non-transitory computer readable storage mediums storing the one or more sequences of instructions of claim 10, wherein the method further comprises estimating, using the machine learning model that is trained, the pixel-wise likelihood of rain and providing the rain distribution in the input image.

\* \* \* \* \*